June 11, 1929.  I. R. METCALF  1,716,594
CLUTCH MECHANISM
Filed Sept. 30, 1927   2 Sheets-Sheet 1
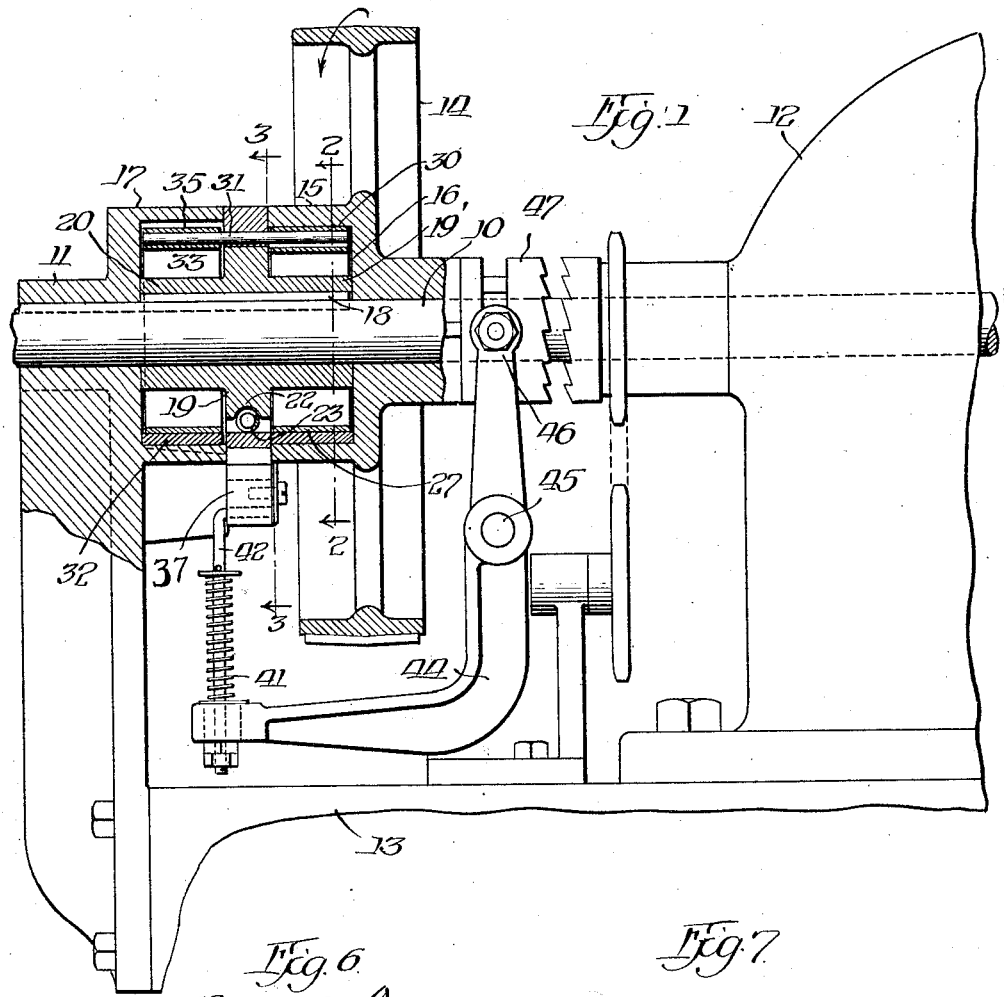
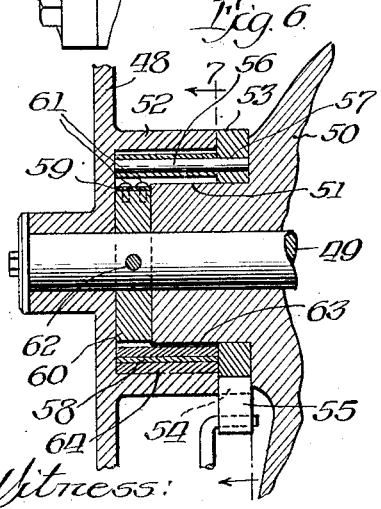
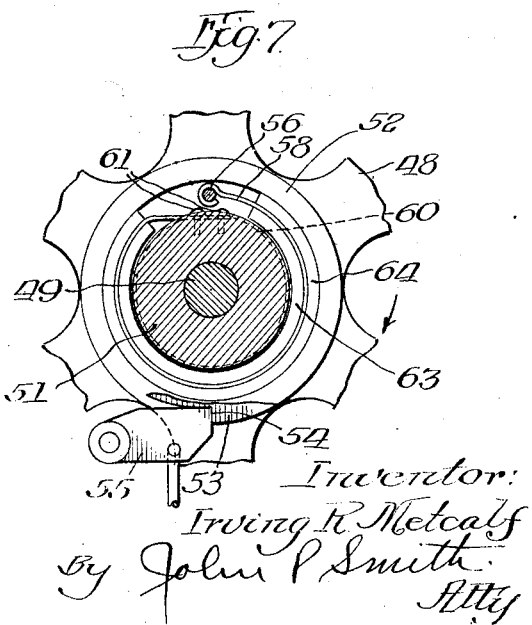
Inventor:
Irving R. Metcalf
By John P. Smith
Atty June 11, 1929.          I. R. METCALF          1,716,594
CLUTCH MECHANISM
Filed Sept. 30, 1927          2 Sheets-Sheet 2
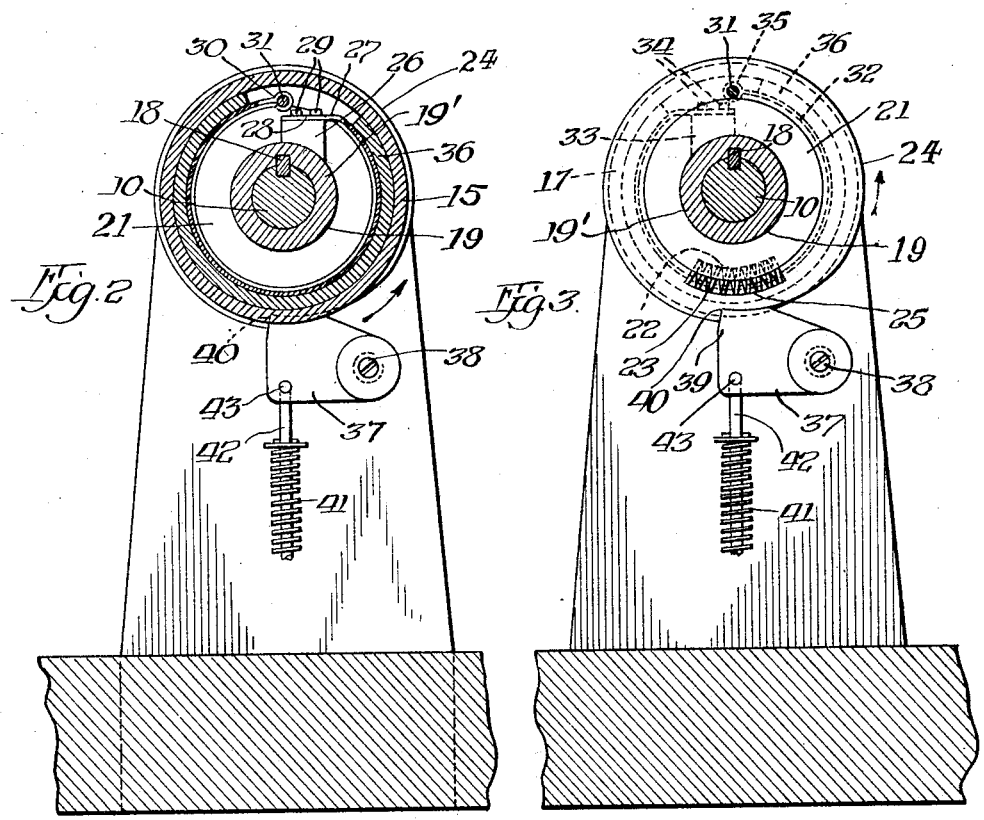
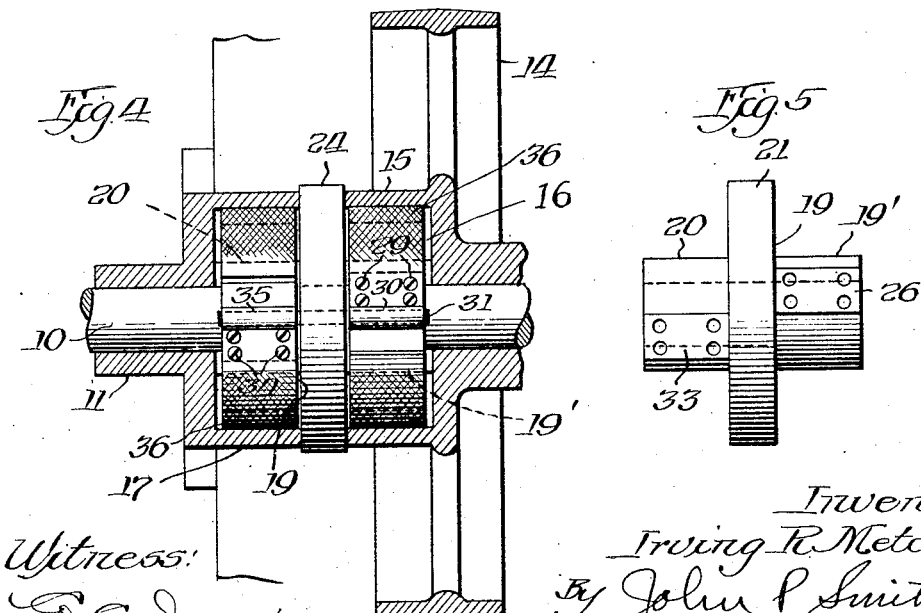
Inventor:
Irving R. Metcalf
By John P. Smith
Atty
Witness:

Patented June 11, 1929.

1,716,594

UNITED STATES PATENT OFFICE.

IRVING R. METCALF, OF GLEN ELLYN, ILLINOIS, ASSIGNOR TO LATHAM MACHINERY COMPANY, A CORPORATION OF ILLINOIS.

CLUTCH MECHANISM.

Application filed September 30, 1927. Serial No. 223,001.

This invention relates to a clutch mechanism and more particularly to a mechanism which may be utilized for operatively connecting and disconnecting a source of power with a driven element.

One of the objects of the present invention is to provide a novel and improved clutch mechanism which is simple in construction and efficient in operation.

A further object of the invention is to provide an improved clutch mechanism which in addition to disconnecting the source of power from the work shaft automatically brakes or stops the movement of the work shaft in a positive manner.

A still further object of the invention is to provide an improved clutch mechanism which, in addition to effecting a connection and disconnection of the driving and driven element also produces a braking effect on the driven element at the instant these elements are disconnected from each other.

These and other objects are accomplished by providing a construction and an arrangement of the various parts in the manner hereinafter described and particularly pointed out in the appended claims.

Referring to the drawings, Fig. 1 is a fragmentary cross-sectional view of a wire stitching machine showing one application of my improved clutch mechanism.

Fig. 2 is a cross-sectional view taken on the lines 2—2 in Fig. 1.

Fig. 3 is a cross-sectional view taken on the lines 3—3 in Fig. 1.

Figure 4 is a top plan cross-sectional view showing the construction of the bands of frictional engaging members.

Fig. 5 is a top plan detailed view of the friction band clamp.

Fig. 6 is a fragmentary cross-sectional view of a modified form of my improved clutch mechanism, and Fig. 7 is a front elevational view partly in cross section of the modified form shown in Fig. 6.

In illustrating one embodiment of my invention I have shown the same in connection with a wire stitching machine but it will, of course, be understood that the clutch mechanism here shown is applicable to various types of machines where it is desirable to connect a continuously power driven shaft with an intermittently driven shaft or to automatically connect and disconnect the power element from the driven element on each complete cycle of operation of the driven element.

In carrying out my invention, I have shown the driven element or shaft 10 mounted in suitable bearings 11 and 12 of the frame of the machine 13. While the fragmentary portion of the machine here shown is a stitching machine, the clutch mechanism is adaptable to various other types of machines. Journaled on the shaft 10 is the driving element or pulley 14. Formed integrally with and on one side of the pulley is an enlarged cylindrical portion 15 having a cylindrical recess 16 therein. This cylindrical recess forms a socket for the reception for one of the brake bands to be hereinafter described. Formed integrally with the bearing 11 and arranged concentrically with respect to the shaft 10 is a cylindrical portion 17 which is of substantially the same diameter as the cylindrical portion 15 of the pulley 14. These cylindrical portions 15 and 17 are in effect internal brake drums which are adapted to have their internal peripheral surfaces engaged by the clutch or brake bands hereinafter described. Secured to the shaft 10 by means of a key 18 is a friction band clamp member 19 which consists of two cylindrical and oppositely extending portions 19' and 20 which are formed integrally with a central or intermediate disc-like portion 21. Formed on one side of the peripheral surface of the disc-like portion 21 is a semi-cylindrical recess 22 which is adapted to receive and support therein a compression spring 23. Mounted concentrically with and engaging the peripheral surface of the disc-like portion 21 of the friction band clamp 19 is a tripping ring 24. The tripping ring 24 is provided with an inner peripheral recess as shown at 25 which registers with the cylindrical recess 22 in the disc-like portion 21. These two recesses 22 and 25, accommodate the spring 23 and normally presses the tripping ring 25 in a direction indicated by the arrow shown in Fig. 3. Secured to a lug 26 formed on the cylindrical portion 19' of the friction band clamp 19 is a brake spring 27. The brake spring 27 is substantially circular in form and has one end as shown at 28 secured by means of bolts 29 to the lug 26, formed on the circular extension 19'. The other or free end of the brake spring has an eye formed thereon as shown at 30 which engages a pin 31. The pin 31 is secured in a suitable aperture formed in the tripping ring 24 in such a manner that a portion of the pin extends on the opposite side of the ring 24. A second brake spring 32 which is substantially circular in form and has one end thereof secured to the lug 33 formed on the circular extension 20. The spring is secured to this lug by means of bolts 34. The other free end of the spring 32 is provided with an eye 35 which engages the pin 31. These braking springs 27 and 32 are reversely arranged and have their opposite ends secured to the friction band clamps 19 and their opposite ends secured to the pin 31 mounted in the tripping ring 24 so that in effect these braking springs are reversely coiled in such a manner that a slight rotation of the tripping ring in one direction expands one of the rings while contracting the other ring and vice versa. From the construction above described, it will be noted that the spring 23 normally presses the tripping ring 24 in a direction indicated by the arrow with respect to the disc portion 21 of the friction band clamp 19 (see Fig. 3). This action of the spring tends to shift the ring 24 so as to contract the brake spring 32 and at the same time expand the brake spring 27. Each of these springs 27 and 32 is provided with suitable friction engaging material 36 which is preferably leather or other suitable braking material. As the brake band 32 contracts it releases its frictional engagement with the internal surface of the drum 17 and when the brake band 27 expands, it frictionally engages internal surface of the drum 15 formed on the driving element or pulley 14 and thereby positively connects the drive pulley 14 with the driven shaft, 10.

The clutch mechanism may be automatically or manually controlled so that on each complete cycle of operation of the shaft the driving element may be disconnected from the driven element. The connection and disconnection of these elements from each other is accomplished by providing a pawl 37 which is pivoted as shown at 38 to the frame of the machine, the free end of the pawl is provided with a trip engaging portion as shown at 39 which is adapted to engage a stop 40 formed in the tripping ring 24. The tripping pawl 37 is normally pressed into engagement with the tripping ring 24 by a spring 41 which is mounted on a connecting or tripping rod 42 and which has its other end pivotally connected as shown at 43. The lower end of this spring may engage a stationary part of the frame and urge the pawl into engagement with the tripping ring and the tripping rod may be operated manually so as to disengage the pawl 37 from the stop 40 in the ring 24.

In the form shown in the drawing, the lower end of the spring 41 engages the free end of the bell crank 44 which is pivoted at 45 on a suitable portion of the frame of the machine. The upper end of the bell crank has a forked end portion 46 which engages a clutch member 47 by means of which the clutch is automatically controlled. This mechanism for automatically controlling the clutch is not necessarily a part of my improved clutch mechanism but is one adaptation of the same and for that reason a more detailed description of this mechanism has not been given.

The operation of my improved clutch mechanism is as follows:

Let us assume that the tripping pawl 37 engages the tripping ring 24 as shown in the position in Figs. 1 to 3 inclusive. Let us assume that the driving element or pulley 14 is operating in a direction indicated by the arrow. Upon the tripping of the pawl 37 either manually or automatically, the spring 23 urges the ring 24 relative to the disc-like portion 21 of the friction band clamp member 19 in a direction indicated by the arrow in Fig. 3. The urging of the ring 24 in this direction relative to the disc-like portion 21, contracts the brake band 32 thereby releasing the grip on the internal surface of the drum 17, at the same time expanding the brake spring 27 causing the same to grip the inner surface of the drum 15 of the pulley 14 thereby operatively connecting the driving element or pulley with the driven element or shaft 10. When the operator desires to disconnect the driving element from the driven element, the pawl 37 is released or permitted to engage the stop 40 in the ring 24 thereby stopping the ring 24 and causing the disc-like portion 21 to rotate slightly with respect to the ring in a direction indicated by the arrow in Fig. 3. This slight relative movement causes the brake band 32 to expand by reason of one end of the brake band being connected to the pin 31 mounted in the ring 24 and the other end of the brake band secured to the lug portion 33 formed integrally with the disc-like member 21. At the same time the reversely arranged brake band 27 is contracted, thereby releasing its grip on the internal surface of the drum 15 of the pulley 14 and simultaneously causing the brake band 32 to expand by reason of one end of the brake band being connected to the pin 31 mounted in the ring 24 and the other end of the brake band secured to the lug portion 33 formed integrally with the disc-like member 21. At the time the reversely arranged brake band 27 is contracted, it releases its grip on the internal surface of the drum 15 of the pulley 14 and simultaneously causing the brake band 32 to expand for gripping the internal surface of the drum 17, disengaging the driving element or pulley 14 from the driven element or shaft 10 and braking the movement of the shaft.

In Figs. 6 and 7 I have shown a modified form of my improved clutch mechanism in which I employ the inner and outer surfaces of a single brake band to perform the function of the double bands shown in the preferred form illustrated in the Figs. 1 to 5 inclusive. In this modified form 48 represents a driving element or pulley. 49 represents the driven element or shaft. The shaft 49 is journaled in a suitable bearing portion in the frame 50 which has a cylindrical drum portion as shown in 51 formed integrally therewith. Formed on one side of the driven element or pulley 48 is a cylindrical portion 52 which is arranged concentrically with and overhangs the drum portion 51 formed on the frame 50. Journaled on the drum portion 51 of the frame 50 is a tripping ring 53 which has a stop 54 formed on the periphery thereof, which is adapted to be engaged by a pawl 55 which in turn is pivoted on a suitable part of the frame of the machine very similar to the manner in which the pawl 37 is pivoted as shown in Fig. 3. Mounted on a pin 56 secured to the ring 48 as shown at 57 is a brake spring 58. The other end of the brake spring has a flattened reduced portion as shown at 59 secured to a disc member 60 by means of screws 61. The disc member 60 is secured to the shaft 49 by means of a pin 62. Mounted on the opposite sides of the brake band 58 is an inner and outer drum engaging member 63 and 64 respectively which is preferably leather or other suitable braking material. The inner drum engaging member 63 is adapted to engage the drum 51 of the frame 50 while the outer drum engaging member 64 is adapted to engage the inner surface of the drum 52 of the driving pulley 48. The brake spring 58 is normally or initially provided with an expanding tension so as to cause the braking member 64 to grip the internal surface of the drum 52 of the driving member 48 and at the same time free the braking member 63 from the drum 52 of the frame 50. When the pawl 55 is tripped or released from the ring 53, the initial tension on the spring 58 causes the spring to expand which in turn causes the braking member 64 to grip the internal surface of drum 52 of the pulley 48 at the same time releasing braking member 63 from the drum 51 of the frame thereby operatively connecting the driving element with the driven element or shaft 49. When it is desired to disconnect the driven element from the driving element, the pawl 55 is permitted to engage the stop 54 of the tripping ring 53 thereby contracting the braking spring 58, releasing the braking member 64 from the driving element 48 and causing the braking member 63 to grip the brake drum 51 of the frame 50 thereby stopping the driven element or shaft 48 and disconnecting the same from the driving element or pulley 48.

From the above description it will be seen that I have provided very simple and efficient clutch mechanism and one in which a braking effect is immediately applied to the driven element at the instant the clutch is disconnected from the driving element. The clutch mechanism here shown and described is adaptable to a variety of uses as well as various types of machines and may be manually or automatically controlled or if desired may be controlled on any predetermined number of cycles of operation.

While in the above specification, I have described two forms which my invention may assume in practise it will, of course, be understood that various other forms of modifications may be made without departing from the spirit and scope of my invention as expressed in the following claims.

What I claim as my invention and desire to secure by Letters Patent is:

1. A clutch mechanism comprising a driving element, a driven element and means including a member secured to said driven element and having a contracting and expanding element for operatively connecting and disconnecting said driving and driven elements and for braking said driven element.

2. A clutch mechanism comprising a driving element, a driven element and means including a member secured to said driven element and having a contracting and expanding member pivotally connected therewith for operatively connecting and disconnecting said driving and driven elements.

3. A clutch mechanism comprising a driving element, a driven element, a member secured to said driven element and means secured to said last named member and arranged concentrically with respect to the same for operatively connecting and disconnecting said driven element from said driving element.

4. A clutch mechanism comprising a driven element, a driving element, and means including a member secured to said driven element having a contracting and expanding element for operatively connecting and disconnecting said driven element and said driving element and for braking said driven element when said driving element is disconnected from said driven element.

5. A clutch mechanism comprising a driving element, a driven element and means including a member secured to said driven element having a contracting and expanding element pivotally connected therewith for operatively connecting said driven element with said driving element and for braking said driven element when said driving element is disconnected from said driven element.

6. A clutch mechanism comprising a driving element, a driven element and a member secured to and arranged concentrically with respect to said driven element for operatively connecting and disconnecting said driving element and said driven element and for braking said driven element when said driving element is disconnected from said driven element.

7. A clutch mechanism comprising a driving element, a driven element and means including a braking element operatively connected with said driven element and engageable with said driving element for operatively connecting and disconnecting said driving element and said driven element.

8. A clutch mechanism comprising a driving element, a driven element and means including a braking element operatively connected with said driven element and engageable with said driving element for operatively connecting and disconnecting said driving element and said driven element, and for braking said driven element when said driving element is disconnected from said driven element.

9. A clutch mechanism comprising a driving element, a driven element and means including a braking element operatively connected with said driven element and arranged concentrically with respect to said driving and driven element, said braking element positioned to engage said driving element for connecting and disconnecting said driven element and said driving element and for braking said driven element the instant said driving element is disconnected from said driven element.

10. A clutch mechanism comprising a driven element and a driving element and means including a single spring secured to said driven element and having braking material secured thereon engageable with said driving element for connecting and disconnecting said driven element and said driving element.

11. A clutch mechanism comprising a driven element and a driving element and means including a single contracting and expanding spring secured to said driven element and having braking material secured thereon engageable with said driving element for connecting and disconnecting said driven element and said driving element.

12. A clutch mechanism comprising a driven element journalled in a frame, a driving element journaled on said frame, and a contracting and expanding element carried by said driven element and engageable with said driving element for connecting and disconnecting said driven element with said driving element.

13. A clutch mechanism comprising a driven element journalled in a frame, a driving element journaled on said frame, and a contracting and expanding element carried by said driven element with said driving element, said contracting and expanding element being engageable with said frame for braking said driven element when said driving element is disconnected from said driven element.

14. A clutch mechanism comprising a driven element, a frame on which said driven element is journaled, a driving element journaled on said frame, a clutch contracting and expanding member carried by said driven element engageable with said driving element, a second clutch contracting and expanding member carried by said driven element and engageable with said frame for braking said driven element when said driving is disconnected from said driven element.

15. A clutch mechanism comprising a frame, a driven element journaled on said frame, a driving element journaled on said frame, a plurality of reversely arranged clutch expanding and contracting members carried by said driven element for engagement respectively with said driving element and said frame for successively disconnecting said driving element from said driven element and for braking said driven element.

16. A clutch mechanism comprising a frame, a driven element journaled on said frame, a driving element journaled on said frame, a friction band clamp member secured to said driven element, reversely arranged contracting and expanding brake springs mounted on said members, the opposite ends of said brake springs being engageable with a tripping ring mounted on said member whereby the actuation of said ring with respect to said member controls the operation of said springs for connecting and disconnecting said driving element and said driven element.

17. A clutch mechanism comprising a frame, a driven shaft mounted on said frame, a driving pulley mounted on said shaft, a friction band clamp member secured to said shaft, reversely arranged coil spring having one end secured to said friction band clamp member and a tripping ring mounted on said friction band clamp member connected to the opposite ends of said spring whereby the actuation of said tripping ring with respect to said friction band clamp member effects a contraction and expansion of said springs for operatively connecting and disconnecting said shaft and pulley.

18. A clutch mechanism comprising a frame, a shaft journaled on said frame, a pulley journaled on said shaft, a member secured to said shaft, two oppositely arranged springs having one of their ends secured to said member, a tripping member mounted on said first named member and having the opposite ends of said springs connected thereto whereby the actuation of said second named member with respect to said first named member, effects a contraction of one of said springs and an expansion of the other of said springs for operatively connecting said driving pulley with said shaft.

19. A clutch mechanism comprising a frame, a shaft mounted on said frame, a pulley journaled on said shaft, a member secured to said shaft, two oppositely arranged expanding and contracting springs secured to said member, a tripping member mounted movably on said first named member and having the other ends of said springs connected thereto whereby when said second named member is moved in a direction with respect to said first named member for disconnecting said driving pulley from said shaft, one of said springs grips said frame for braking said shaft.

20. A clutch mechanism comprising a frame, a shaft journaled in said frame, a pulley journaled on said shaft, said frame having a brake drum formed thereon, said pulley having a brake formed thereon and arranged concentrically with respect to the brake drum on said frame, a spring supporting member secured to said shaft, two oppositely arranged contracting and expanding springs secured to said member having one end thereof engageable with the drum on said frame, and the other end thereof engageable with the drum on said pulley, a tripping member mounted on said first named member and connected with the opposite ends of said springs whereby the actuation of said tripping member causes an expansion and contraction of one or the other of said springs simultaneously for disconnecting and connecting said shaft from said pulley.

21. A clutch mechanism comprising a driving element, a driven element, and means carried by said driven element for connecting and disconnecting said driving and driven elements and for braking said driven element when said driving element is disconnected from said driven element.

In testimony whereof I have signed my name to this specification, on this 28th day of September, A. D. 1927.

IRVING R. METCALF.